(No Model.)
J. L. GARNER.
DRAFTING PEN.
No. 534,712. Patented Feb. 26, 1895.
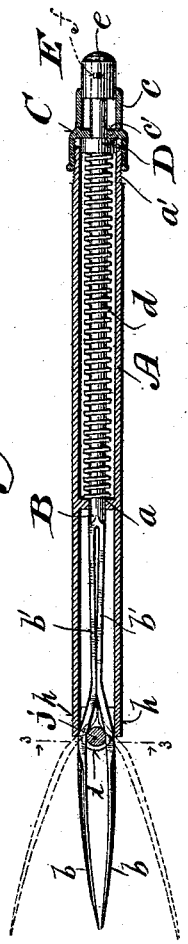
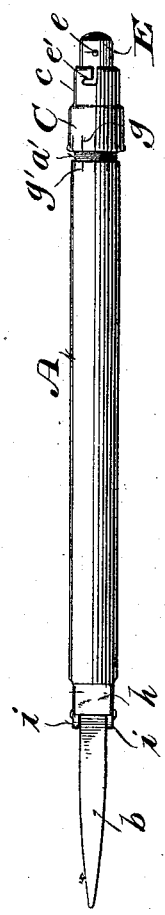
Witnesses
Geo W Young
Henry Dankert
Inventor
John L. Garner
By H.G. Underwood
Attorney

UNITED STATES PATENT OFFICE.

JOHN L. GARNER, OF MILWAUKEE, WISCONSIN.

DRAFTING-PEN.

SPECIFICATION forming part of Letters Patent No. 534,712, dated February 26, 1895.

Application filed July 14, 1894. Serial No. 517,523. (No model.)

*To all whom it may concern:*

Be it known that I, JOHN L. GARNER, a citizen of the United States, and a resident of Milwaukee, in the county of Milwaukee, and in the State of Wisconsin, have invented certain new and useful Improvements in Drafting-Pens; and I do hereby declare that the following is a full, clear, and exact description thereof.

My invention relates to drafting pens, and consists in certain peculiarities of construction and combination of parts, as will be fully set forth hereinafter and subsequently claimed.

In the drawings: Figure 1 represents a longitudinal central section taken through a pen embodying my improvements. Fig. 2 is a plan view of the same. Fig. 3, is a detail sectional view, on the line 3—3 of Fig. 1.

A represents the handle or holder of the pen, of generally tubular construction, as shown, but with an interior diaphragm, $a$, forward of the center, and which latter is provided with a transverse perforation therethrough to receive and support the shank B of the pen proper, the latter comprising two spring blades $b\ b$, each connected by a spring arm $b'$ with said shank B. The rear outer end of the handle A is reduced in diameter and screw-threaded, as shown at $a'$, to receive a correspondingly interiorly screw-threaded cap, C, which has an open end $c$, of reduced diameter, and a perforated diaphragm $c'$ to receive and support the projecting rear end of the described pen-shank B, there being a collar D, on said shank B, rigidly secured thereto when the holder and pen have been put together, and after a spiral spring, $d$, has been slipped on said shank, one end of said spring abutting against the said collar D, and the other end against the described diaphragm $a$. The open end $c$ of the cap C receives a plug or thumb-piece E which fits snugly within said open end and is secured to the adjacent end of the shank B in such manner as to be capable of turning on said shank, but without danger of detachment therefrom. The plug E is preferably provided with a pin $e$, projecting through the bore of said plug and into an exterior circumferential groove $f$ (shown in dotted lines, in Fig. 1) in the shank B. This pin also projects outwardly from the plug E for locking engagement with an L-shaped slot $e'$ in the cap C, as hereinafter described. The cap C is preferably milled, or cross-hatched, to render the same more easily turned and more securely held and is provided with a scale $g$ as shown, the adjacent end of the holder A being provided with one or more graduation marks $g'$, for the purpose of regulating the gage of the pen, as hereinafter set forth.

The forward end of the holder A is squared, as shown at $h\ h$, for a certain distance back, and said end is further provided with two projecting ears or lugs $i\ i$ to receive a rod or cross-piece $j$ (preferably round) to serve as a wedge or spreader for the pen blades $b\ b$, as hereinafter explained, one of said blades passing between this rod and the adjacent end of the holder, on each side, as shown.

The operation of my device will be readily understood from the foregoing description of its construction, taken in connection with the accompanying drawings.

When the parts have all been put together, and secured in the relative position shown, in full lines in Fig. 1, the pen blades are practically closed and ready when supplied with ink for drawing a very fine line. In order to increase the gage of the blades, the screw-cap C is turned the requisite distance, this being accurately determined by means of the described scale and graduation marks $g\ g'$, the diaphragm $c'$ of the cap, as it is screwed down, bearing against the rigid collar on the shank B of the pen, and forcing the latter forward, thereby spreading the blades $b$, on account of the wedge-shape of the spring-arms $b'$ at their juncture with the blades proper. To diminish the gage at any time, it is only necessary to turn the cap C in the reverse direction as the spring $d$ will force back the shank B and with it the blades $b\ b$. In order to clean or sharpen the blades $b\ b$, it is necessary to spread them apart widely, as shown in dotted lines in Fig. 1, and to accomplish this it is only necessary to press upon the plug or thumb-piece E, and in order to maintain said blades in this position, the described pin $e$ is pushed the length of the longitudinal branch of the described L-shaped slot $e'$, and then the said plug E is turned to lock the said pin $e$ within the transverse branch of said slot, after the fashion of a bayonet-lock, when the said blades $b$ $b$ can be readily cleaned or sharpened. In order to hold the blades with absolute steadiness, and prevent any accidental movement thereof, it is necessary that the metal of which the blades and their spring-arms are formed should be of uniform thickness for the entire distance throughout those portions thereof that pass between the spreading rod $j$ and the adjacent ends of the holder A, and the described squared construction of said front end of the holder, in connection with the squared surfaces of the blades at this point, (as shown best, in section, in Fig. 3) prevents any possibility of lateral play.

It will be noticed that as there is no adjusting screw adjacent to the blades, as in the ordinary drafting pens, the view of the work is entirely unobstructed while using my improved pen, which is a great advantage, and as the blades separate with equable motion, the pen consequently will not throw any ink remaining between the blades when they are being spread for cleaning. Further, by my described construction the gage to which the blades have been set is not varied or disturbed in the slightest degree by pushing them forward for cleaning, as when they are restored to place they will remain at the point to which they were last adjusted by the screw-cap before the plug or thumb-piece was operated.

When I desire to set my pen to a certain gage for the majority of the work to be done, and have (as frequently) occasion to draw certain lines to a much wider gage, I accomplish this by first setting the blades to the desired narrow gage by means of the screw-cap C, and then I turn the plug or thumb-piece E around until its pin $e$ is beyond the line of the slot $e'$, and then, whenever I desire to draw the wide lines, I merely press on the plug E til its pin $e$ engages with the edge of the end $c$ of the cap C, which will serve to push the shank B far enough forward to very considerably increase the gage of the blades and make the lines of the desired extra width, without disturbing the gage to which the blades were first set, and to which they will at once return, on the removal of pressure from the thumb-piece, by reason of the force of the retracting-spring.

Having thus described my invention, what I claim as new, and desire to secure by Letters Patent, is—

1. In a drafting pen, the combination with a tubular holder, of a longitudinally movable pen-shank supported therein and terminating in blades united to said shank by integral spring-arms, a spreading device interposed between said blades adjacent to their juncture with said spring-arms and connected to the front end of said holder, and means for forcing said shank forward and thereby spreading said blades, and other means for retracting said shank and thereby drawing said blades together, substantially as set forth.

2. In a drafting pen, the combination with a tubular holder, squared at its front end, of a longitudinally movable pen-shank supported therein and terminating in blades united to said shank by integral spring-arms and a spreading rod interposed between said blades and secured to said front end of the holder, the portions of said blades and their spring arms which move between said spreading rod and said squared ends of the holder being correspondingly squared on their outer surfaces, and of uniform thickness throughout all of said movable portions, whereby all lateral play and unsteadiness is obviated, substantially as set forth.

3. In a drafting pen, the combination with a tubular holder, of a longitudinally movable pen-shank supported therein and terminating in blades united to said shank by integral spring-arms, said spring-arms being separated to form a wedge at their juncture with said blades, a rod secured to the front end of the holder and passing between said blades adjacent to said wedge-formation, a retracting spring surrounding said shank and held between limits within said holder, and a screw-cap on the rear end of said holder, in engagement with said shank, for regulating the gage of said blades, substantially as set forth.

4. In a drafting pen, the combination with a tubular holder, of a longitudinally movable pen-shank supported therein and terminating in blades united to said shank by integral spring arms, a spreading device interposed between said blades adjacent to their juncture with said spring arms and connected to the front end of said holder, a plug or thumb-piece on the rear end of said pen-shank for forcing the latter to its extreme forward limit, and thereby spreading the blades to their widest extent, a locking device for retaining the parts in this position, and a retracting spring on said shank for restoring the parts to their normal position, substantially as set forth.

5. In a drafting pen, the combination with a tubular holder, of a longitudinally movable pen-shank supported therein and terminating in blades united to said shank by integral spring arms, a spreading device interposed between said blades adjacent to their juncture with said spring arms and connected to the front end of said holder, a retracting spring surrounding and in engagement with said pen-shank within said holder, a screw-cap on the rear end of said holder, in engagement with said shank, and provided with a slot, a plug or thumb-piece circumferentially movable on the end of said shank, and longitudinally movable with said shank within said screw-cap, and a pin on said plug for engagement within said slot, or against the edge of the end of said screw-cap, substantially as set forth.

6. In a drafting pen, the combination with a tubular holder, of a longitudinally movable pen-shank supported therein and terminating in blades united to said shank by integral spring arms, a spreading device interposed between said blades adjacent to their juncture with said spring arms and connected to the front end of said holder, a retracting spring surrounding and in engagement with said pen-shank within said holder, a screw-cap on the rear end of said holder in engagement with said shank, a plug or thumb-piece circumferentially movable on the end of said shank and longitudinally movable with said shank within said screw-cap, a locking device for uniting said plug and cap temporarily together and a scale, and graduation mark or marks, upon said screw-cap and the adjacent exposed end of said holder, substantially as set forth.

In testimony that I claim the foregoing I have hereunto set my hand, at Milwaukee, in the county of Milwaukee and State of Wisconsin, in the presence of two witnesses.

JOHN L. GARNER.

Witnesses:
H. G. UNDERWOOD,
HENRY DANKERT.